UNITED STATES PATENT OFFICE.

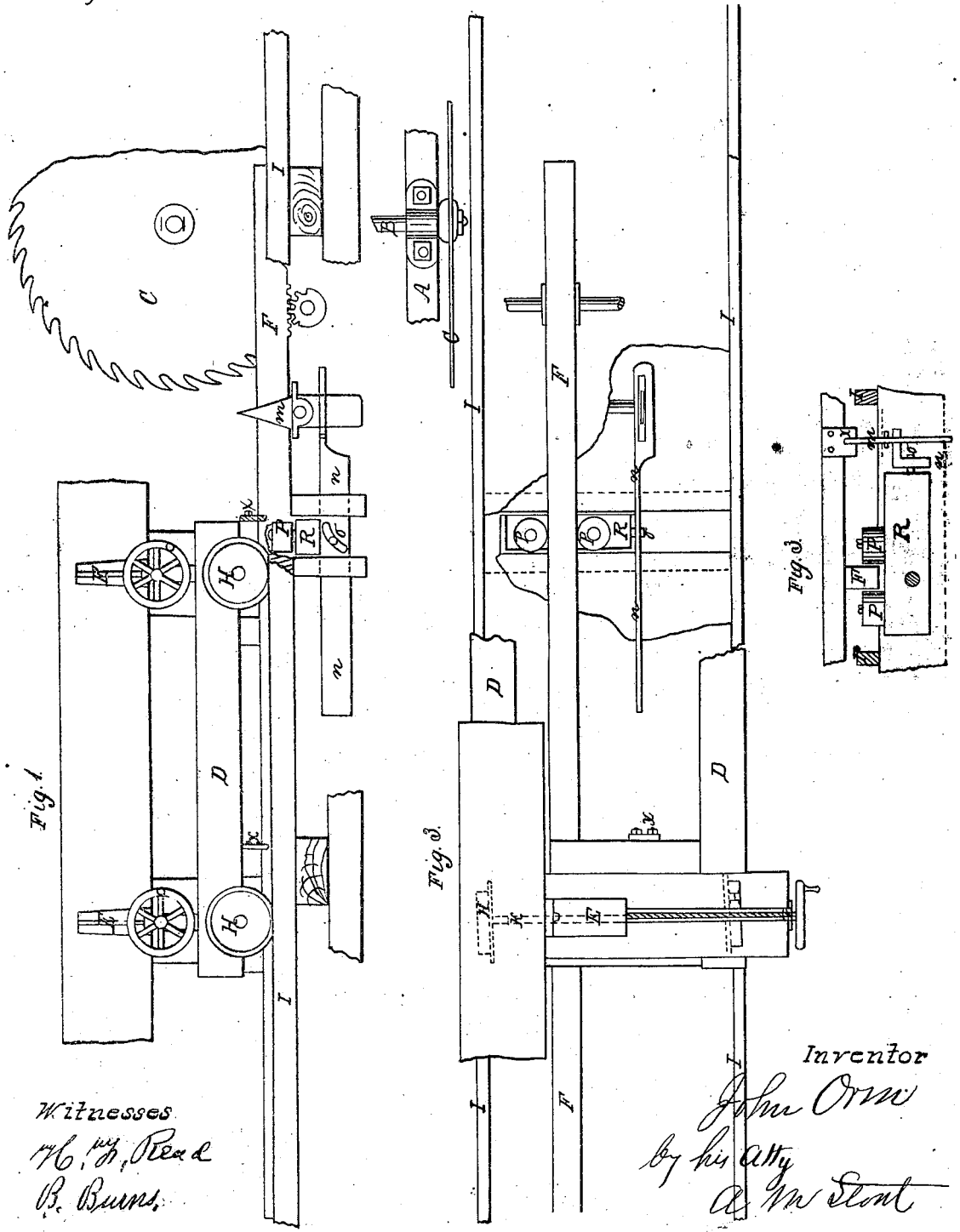

JOHN ORM, OF PADUCAH, KENTUCKY.

IMPROVEMENT IN CIRCULAR-SAW MILLS.

Specification forming part of Letters Patent No. 92,466, dated July 13, 1869.

*To all whom it may concern:*

Be it known that I, JOHN ORM, of Paducah, in the county of McCracken and State of Kentucky, have invented a new and useful Improvement in Circular-Saw Carriages; and I do declare that the following is a full, clear, and exact description thereof, which will enable others skilled in the art to make and use the same, reference being had to the accompanying drawings, forming part of this specification.

Figure 1 is a vertical longitudinal section of the carriage-way and carriage of a circular-saw mill, illustrating my improvements. Fig. 2 is a top view of same. Fig. 3 is an end view of same.

The object of my invention is to improve the construction of the carriages of circular-saw mills, so as to make the operating of them more effective and convenient; and said improvement consists in the device for holding the carriage to its place while the log is being fed to the saw, as is hereinafter more fully described.

The truck-frame D or carriage is mounted upon wheels H, which roll along the rail of the carriage-way I. The wheels H of the carriage are flanged, and are so arranged upon their axles that the distance between the outer sides of the flanges of each pair of wheels may be three-eighths of an inch (more or less) less than the distance between the inner sides of the rails, so that the said carriage or truck may have a slight lateral movement. The axles K of the wheels are secured to the carriage or truck frames D in a slightly-inclined position, as shown in Fig. 2, so that the ends of the axles K toward the saw are set one inch (more or less) to the rear of their other or outer ends.

By this construction, as the carriage is fed forward toward the saw the flanges of the wheels will be pressed against the side of the inner rail of the carriage-way, and when the carriage is running back the flanges of the outer wheels will be pressed against the sides of the outer rail, moving the log laterally from the saw, and preventing the log from being scarred by the saw while the carriage is being run back.

In connection with said carriage, I have a rock-shaft, R, with guide-rolls P, which work on the feed or guide rail F, said feed or guide rail being heavier than those ordinarily used. This device is so constructed that when the carriage is being fed to the saw the outer guide-roll will press the rack or feed-rail F toward the saw C, and hold the flanges of the truck-wheels H firmly to the inner rail, I, so that in case the saw C should be inclined to dodge (which is frequently the case) it cannot force the carriage to the outer rail. In backing, a reversed motion is obtained by the same device, except in flitching or preparing to resaw. In that case, the carriage not being fed far enough for the bar X, which is made fast to the carriage D, to trip the perpendicular bar m, consequently the car passes back upon same track without dragging the inner piece of timber against the inner side of the saw. This device consists in studs x and y, which are pieces of iron made fast to the carriage or truck frame D, so that when the carriage is moved the studs x and y move the perpendicular bar m, the lower part of which works in a slot of the bar n and moves the bar the required distance, the slot in n being longer than the width of the bar m, so that after the studs x and y pass over it it will stand perpendicular. Consequently, when the carriage is backed it will move in an opposite direction. The bar n has a diagonal slot, O, through which a wrist works, connecting with the rock-shaft R, which contains the guide-rolls P P, which guide the feed-rail.

I claim as new and desire to secure by Letters Patent—

The device herein described for guiding and controlling the lateral motion of a circular-saw-mill carriage, consisting of the parts m n R P P, in combination with the feeding guide-bar F, when the same are constructed to operate substantially in the manner and for the purpose set forth.

JOHN ORM.

Witnesses:
 GEORGE LANGSTAFF,
 T. L. LEE.